United States Patent
Hammer et al.

(10) Patent No.: US 7,854,976 B2
(45) Date of Patent: Dec. 21, 2010

(54) PIGMENTED AND INTERNALLY IMPREGNATED FIBROUS CELLULOSE SAUSAGE CASING

(75) Inventors: Klaus-Dieter Hammer, Mainz (DE); Herbert Gord, Ingelheim (DE); Jens Foegler, Taunusstein (DE); Michael Seelgen, Idstein (DE)

(73) Assignee: Kalle GmbH, Wiesbaden (DE)

( * ) Notice: Subject to any disclaimer, the term of this patent is extended or adjusted under 35 U.S.C. 154(b) by 517 days.

(21) Appl. No.: 12/066,186

(22) PCT Filed: Sep. 12, 2006

(86) PCT No.: PCT/EP2006/008863
§ 371 (c)(1),
(2), (4) Date: Mar. 7, 2008

(87) PCT Pub. No.: WO2007/031269
PCT Pub. Date: Mar. 22, 2007

(65) Prior Publication Data
US 2008/0274237 A1    Nov. 6, 2008

(30) Foreign Application Priority Data
Sep. 16, 2005    (DE) .................... 10 2005 044 321

(51) Int. Cl.
*B29D 22/00*    (2006.01)
*B29D 23/00*    (2006.01)

(52) U.S. Cl. .................... 428/34.8; 428/35.6; 428/36.4; 428/36.91; 428/35.7; 427/181

(58) Field of Classification Search ................ 428/34.8, 428/35.6, 36.4, 36.91, 35.7; 427/181
See application file for complete search history.

(56) References Cited

U.S. PATENT DOCUMENTS

| 4,142,013 A | 2/1979 | Hammer et al. |
| 5,096,754 A * | 3/1992 | Hammer et al. ............ 428/34.8 |
| 2007/0166489 A1 * | 7/2007 | Foegler et al. ............ 428/34.8 |

FOREIGN PATENT DOCUMENTS

| DE | 35 43 633 A1 | 6/1986 |
| DE | 36 20 165 A1 | 12/1987 |
| DE | 40 02 083 A1 | 8/1991 |
| DE | 103 60 610 A1 | 7/2005 |
| EP | 0 087 241 A1 | 8/1983 |
| EP | 0 286 026 A1 | 10/1988 |
| WO | WO 2005063027 A1 * | 7/2005 |

* cited by examiner

*Primary Examiner*—Michael C Miggins
(74) *Attorney, Agent, or Firm*—ProPat, L.L.C.

(57) ABSTRACT

The invention relates to a double-viscosed fibrous cellulose sausage casing having a pigmented outer cellulose hydrate layer and an impregnated internal cellulose hydrate layer. The impregnation of the internal cellulose hydrate layer includes a collagen hydrolysate and the outer cellulose hydrate layer includes at least one white pigment, preferably having titanium dioxide pigments. The invention further relates to a method for producing the fibrous cellulose sausage casing and also to its use as artificial sausage casing.

18 Claims, No Drawings

PIGMENTED AND INTERNALLY IMPREGNATED FIBROUS CELLULOSE SAUSAGE CASING

CROSS-REFERENCE TO RELATED APPLICATIONS

This application is being filed under Rule 1.371 as a National Stage Application of pending International Application No. PCT/EP2006/008863 filed Sep. 12, 2006, which claims priority to the following parent application: German Patent Application No. 10 2005 044 321.4, filed Sep. 16, 2005. Both International Application No. PCT/ EP2006/008863 and German Patent Application No. 10 2005 044 321.4 are hereby incorporated by reference herein in their entirety.

FIELD OF THE INVENTION

The invention relates to a double-viscosed fibrous cellulose sausage casing having a pigmented outer cellulose hydrate layer and an impregnated inner cellulose hydrate layer. The invention further relates to a process for production thereof and also to the use of the fibrous cellulose sausage casing as an artificial sausage casing.

BACKGROUND OF THE INVENTION

Double-viscosed cellulose fiber sausage skins have long been known. In their production, a wet-strength fiber paper is shaped to form a tube which is then internally and externally coated with viscose. The viscose-coated tube then runs through a plurality of precipitation and wash baths in which the cellulose is regenerated from the viscose. It is further known to mix the viscose applied to the outside with white pigments, especially with titanium dioxide pigments. In this manner a white casing is obtained. Until a meat mixture (sausage emulsion) stuffed into the casing is tied off, it gives off colored meat juice which diffuses into the casing and causes unsightly spots in the outer pigmented cellulose hydrate layer. To counteract this effect, the inner, non-pigmented cellulose hydrate layer has been impregnated with glucono-δ-lactone. The glucono-δ-lactone permits the meat juice to coagulate, so that it can no longer pass into the outer, white-pigmented cellulose hydrate layer (DE-A 35 43 633). To achieve the desired effect, the cellulose hydrate layer, however, must be impregnated on the inside with a relatively large amount of glucono-δ-lactone. Another approach to solving this problem was to precipitate the meat juice with organic acids (DE-A 36 20 165).

The previously known agents for coagulating the colored meat juice are all more or less water soluble and are therefore extruded during soaking of the casings. Furthermore, the structure of the cellulose hydrate layer is dependent on the precipitation conditions, so that the amount of the coagulating agent is not always sufficient in order to precipitate out the meat juice quantitatively. The previously known white cellulose fibre sausage skins continued to exhibit unwanted spots after stuffing.

SUMMARY OF ADVANTAGEOUS EMBODIMENTS OF THE INVENTION

The object was therefore to modify the inner cellulose hydrate layer in such a manner that spot formation is reliably prevented, more precisely, independently of what the structure of the cellulose hydrate is and how long the sausage skin was soaked before stuffing.

It has been found that relatively low-molecular-weight collagen hydrolysates are taken up well by the inner cellulose hydrate layer and can also be anchored there, so that they can no longer be extracted by washing.

DETAILED DESCRIPTION OF ADVANTAGEOUS EMBODIMENTS OF THE INVENTION

The invention therefore relates to a double-viscosed fibrous cellulose sausage casing having a pigmented outer cellulose hydrate layer and an impregnated inner cellulose hydrate layer which is characterized in that the impregnation of the inner cellulose hydrate layer comprises a collagen hydrolysate.

The collagen hydrolysate may be produced, in particular, by enzymatic, acid or alkaline hydrolysis of collagen. The expression "hydrolysate", in the context of the present invention, is to be taken to mean a degraded collagen which, at 20 to 30° C., preferably no longer forms a solid gel. It generally has a molecular weight of about 3000 to 30 000 dalton, preferably from 3500 to 25 000 dalton, particularly preferably from 4000 to 12 000 dalton, determined by gel permeation chromatography. It has in this case a relatively broad molecular weight distribution in this range. In warm water (60° C.) it is completely soluble, at least colloidal solutions may be obtained. In a preferred embodiment, the collagen hydrolysate is a gelatin having a bloom number of 0 to 100, preferably from 0 to 50. A gelatin having a bloom number of 0 no longer gels. Owing to its relatively low molecular weight, the collagen hydrolysate can penetrate deep into the cellulose casing and in this case fill pores of the cellulose gel sausage skin or of the predried cellulose casing. This becomes particularly clear when the casing is studied as follows: 250 mg of material are evenly scraped off from a 500 cm$^2$ area of the inside of the casing. The fraction of collagen hydrolysate in this 250 mg is then determined and converted to an area of 1 m$^2$. The casing of the invention contains thereafter, on the inner surface, per square meter, about 60 to 400 mg, particularly preferably coated with about 30 to 150 mg of collagen hydrolysate. From the same sample surface, then, uniformly a further 250 mg of material are scraped off. The fraction of collagen hydrolysate therein is still 50 to 90% of the fraction in the first material scraped off. Also, in a third passage 250 mg scraped off from the same surface, collagen hydrolysate is still present. The fraction is then still 40 to 80% of the fraction in the 250 mg of material first obtained. As a result of the treatment, with collagen hydrolysate, the casing in addition is permanently plasticized. By filling the pores in the regenerated cellulose, the permeation also decreases. This effect is expressed particularly clearly in the case of glycerol-free fiber sausage skins for long-life sausage. Here, the permeation, as a result of the treatment, can decrease to values of less than 50 l/m$^2$ d at 40 bar.

In order that the collagen hydrolysate is not extracted again by washing even after relatively long soaking of the food casing, the collagen hydrolysate can additionally be bound to the cellulose. Low-molecular-weight crosslinkers having two or more reactive groups which produce covalent bonds between the collagen hydrolysate and the cellulose are particularly suitable for this. These are, for example, compounds having two or more carbaldehyde groups, such as glyoxal, glutardialdehyde, succinic dialdehyde or sugar dialdehydes; in addition, also epoxidized linseed oils, dialkylketenes or tannin. Also, a plurality of crosslinkers can be used simultaneously. The crosslinkers are generally mixed with the impregnating solution. The heat supplied during subsequent drying of the casing is generally sufficient in order to achieve complete crosslinking. The bonding between the collagen hydrolysate and the cellulose can in principle also be produced in another way, for example by irradiating with high-energy radiation, such as UV-radiation or γ-radiation.

The cellulose hydrate layer situated on the inside of the casing can be impregnated additionally with glucono-δ-lactone. Compared with the casing disclosed by DE-A 35 43 633, the fraction of glucono-δ-lactone can be lower on account of the action of the collagen hydrolysate. Generally, a fraction of 1.0 to (5.0% by weight, preferably 2.0 to 5.0%, of glucono-δ-lactone, in each case based on the dry weight of the inner cellulose hydrate layer, has proved to be expedient.

The composition used for the impregnation generally has a pH in the range from 1 to 5. Preferably, the collagen hydrolysate, optionally combined with at least one crosslinker, is dissolved in dilute aqueous acetic acid. A 3% strength acetic acid solution, for example, is highly suitable. The fraction of collagen hydrolysate in the aqueous composition is expediently about 2 to 30% by weight, preferably about 2.5 to 20% by weight, in each case based on the total weight of the impregnating composition. For linking to the cellulose, the solution generally further contains at least one crosslinker in a fraction of about 2 to 10% by weight, preferably about 3 to 5% by weight, in each case based on the weight of the collagen hydrolysate.

The aqueous composition which contains collagen hydrolysate can be applied additionally also on the outside of the casing. Such an outer preparation increases, in particular, the resistance to cellulytic enzymes (cellulases), as are formed by mold fungi in the production of mold-ripened long-life sausages. In addition, it causes a firm adhesion of the mold growth.

In addition, the aqueous composition used for the impregnation can also further contain collagen fibers. These have a considerably higher molecular weight, at 250 000 dalton and more, compared with the collagen hydrolysates, and can therefore no longer be practically incorporated into the cellulose hydrate layer. If the collagen fibers are on the inside, then the casing adheres considerably more strongly to the sausage emulsion.

The food casing of the invention can be produced using conventional processes and known devices. In order to impregnate the inner surface, for example a predefined amount of impregnating solution can be charged into the interior of the tube. The solution is then held stationary in a constantly newly formed loop of the tube conducted through the device ("slug coating"). The tube is preferably impregnated while the regenerated cellulose is still in the gel state, i.e. before the tube is dried for the first time.

The food casing according to the invention is primarily used as artificial sausage casing, especially for long-life sausage, such as salami.

The examples hereinafter serve to illustrate the invention. Percentages therein are percentages by weight, unless stated otherwise or directly clear from the context.

EXAMPLE 1

Into a fiber-reinforced cellulose gel sausage skin of caliber 60, which was double-viscosed (60% viscose outside, 40% viscose inside on the fiber reinforcement) and the outer cellulose hydrate layer of which contained 9% $TiO_2$ white pigment, based on the dry weight, of the total regenerated cellulose (situated on the inside and outside), before entry into the dryer, 8 liters of an aqueous impregnating solution were charged which contained

| | |
|---|---|
| 6% | collagen hydrolysate (mean molecular weight about 8000 to 10000 dalton) |
| 0.36 | glyoxal (3%, based on the weight of the collagen hydrolysate) |
| 3% | glycerol and |
| 6% | glucono-δ-lactone. |

The impregnated tube was then conducted through the dryer in the inflated state, where it was dried to 8 to 12% residual moisture. Subsequently it was moistened to 16 to 18% and shirred to form shirred sticks.

The molecular weight of the collagen hydrolysate was determined by gel permeation chromatography using a SUPERDEX® Peptide 10/300 GL column from Amersham Bioscience. The calibration substances used in this case were:

| | | | |
|---|---|---|---|
| B-Lactoglobin | MW | 35000 dalton | 5 mg/ml |
| Ribonuclease A | MW | 13700 dalton | 5 mg/ml |
| Cytochrome C | MW | 12500 dalton | 1 mg/ml |
| Apratinin | MW | 6512 dalton | 2 mg/ml |
| Vitamin B12 | MW | 1355 dalton | 0.2 mg/ml |
| Buffer: | | 0.02 M phosphate buffer and 0.25 M NaCl, pH 7.2 | |
| Flow rate: | | 0.4 ml/min | |
| Temperature: | | 20° C. | |
| Detection: | | 0.02 AUFS, 280 nm | |
| Sample quantity: | | 250 µl | |

80% of the main peak of the collagen hydrolysate was in the range from 8000 to 10000 dalton.

The application rate of collagen hydrolysate to the inside of the tube was determined by scraping off in the above-described manner. In this manner it was found that the uppermost regions of the inside contained 120 to 180 mg of collagen hydrolysate per square meter.

The shirred sticks were then stuffed with salami sausage emulsion and ripened for a plurality of weeks under conventional conditions. After completion of the ripening time, the appearance of the surface of the sausage was tested. There were no brown specks or other discolorations on the white casing.

EXAMPLE 2

Into a fiber-reinforced cellulose gel sausage skin of caliber 45 which was double-viscosed (60% viscose outside, 40% viscose inside on the fiber reinforcement) and the outer cellulose hydrate layer of which contained 9% $TiO_2$ white pigment, based on the total weight, of the regenerated cellulose, before entry into the dryer, were charged 6 liters of an aqueous composition having 4% solids fraction. The solids comprised 50% collagen hydrolysate and 50% collagen fibers. The composition in addition contained 3% glyoxal, based on the solids weight. In total, the composition contained:

| | |
|---|---|
| 4% | collagen hydrolysate (mean molecular weight about 12000 dalton) |
| 2% | collagen fibers |
| 0.15% | glyoxal (3%, based on the solids weight) |
| 3% | glycerol and |
| 6% | glucono-δ-lactone. |

Using a roller applicator, an aqueous composition likewise having 4% solids fraction (80% collagen hydrolysate and 20% collagen fibers) and 3%, based on the solids weight, of glyoxal as crosslinker, was applied to the outer surface. In total, the composition contained

| | |
|---|---|
| 3.2% | collagen hydrolysate (mean molecular weight about 6000 dalton) |
| 0.8% | collagen fibers |
| 0.24% | glyoxal (3%, based on the solids weight) and |
| 3.0% | glycerol. |

The impregnated tube was then conducted through the dryer in the inflated state, where it was dried to 8 to 12% residual moisture. Subsequently it was moistened to 16 to 18% and shirred to form shirred sticks. The collagen application rate was, on the inside in the uppermost layer, 45 mg/m$^2$, in the second layer 35 mg/m$^2$, and in the third layer 25 mg/m$^2$. On the outside, the application rate was 80 mg/m$^2$ in the uppermost layer and 60 mg/m$^2$ in the underlying second layer. The application rate was, as described above, determined on the basis of samples which were obtained by uniform scraping off of in each case 250 mg of solid from a 5 dm$^2$ size area. The casings thus impregnated were considerably softer than non-impregnated casings. The cellulose degradation caused by cellulase was only 4%, while a non-impregnated casing exhibited a degradation of 14%. The cellulase resistance was determined according to a standardized method in which the cellulytic enzymes act on the sausage skin and the weight loss caused thereby is determined. Determination proceeded gravimetrically. For this, a sample of the casing having a size of about 100 cm$^2$ was washed until it was free of glycerol, dried and comminuted. The pieces were then covered with an aqueous solution which comprised 5 Gt of a 0.1% strength aqueous cellulase solution and 95 ml of aqueous acetate buffer (for setting the pH to about 5), shaken and subsequently stored for 24 hours at 39° C. The samples were thereafter extracted with water, dried (3 hours at 110° C.) and weighed again. The percentage weight loss was then the measure of the cellulase degradation.

The shirred sticks were then stuffed with salami sausage emulsion. The sausages were ripened under conventional conditions. The casing showed improved adhesion compared with casing without impregnation. Nevertheless, it was able to be removed from the sausage emulsion without problems. Even after the ripening period, no specks or discolorations were visible on the white outside.

EXAMPLE 3

Use was made of a double-viscosed cellulose casing of caliber 39 which was reinforced with a fiber paper insert and contained, in the outer cellulose hydrate layer, 9% titanium dioxide white pigment, based on the dry weight of the total regenerated cellulose (inside and outside), and in the production of which the viscose had been mixed with 5% alginate, 1.5% of a copolymer of units of N-vinylpyrrolidone and ethyl (2-methacryloyloxyethyl)dimethylammonium sulfate (the copolymer is available under the name GAFQUAT® 755N from GAF Chem. Corp) and calcium stearate. Alginate and GAFQUAT® acted as primary (non-extractable) plasticizers, such that instead of the otherwise conventional 22%, only 10% glycerol was sufficient for the casing. The casing was impregnated on the outside in the laid-flat state with an aqueous composition which had a solids fraction of 4%. The solids fraction was composed of 80% collagen hydrolysate and 20% collagen fibers. The composition, in addition, contained 3% glyoxal as crosslinker, based on the solids weight, and also 4% glucono-δ-lactone and 3% glycerol, in each case based on the weight of the composition.

The inner impregnation proceeded just before entry of the casing into the dryer. For this, use was made of a composition likewise having 4% solids fraction, wherein the solid comprised 50% each of collagen hydrolysate and collagen fibers. In addition, the composition contained 3% glyoxal, based on the solids weight, 5% glucono-δ-lactone and 3% glycerol, in each case based on the weight of the composition.

The tube was dried, as is conventional, in the inflated state with hot air to a moisture content: of 8 to 12%, then moistened to 16 to 18% and shirred to form shirred sticks. From the analysis of in each case 250 mg samples which had been scraped off from 5 dm$^2$ size areas of the inside and outside, an application rate of 188 mg of collagen hydrolysate or hydrolysate plus fibers per square meter resulted on the outside and 86 mg per square meter on the inside. The casing thus produced exhibited a permeation of 38 l/m$^2$ d. It was very soft and supple so that it could be easily processed.

The casing was stuffed with salami sausage emulsion. The sausages were mold-ripened for a plurality of weeks. The mold grew slowly, uniformly distributed and dense as a short "lawn". It adhered in this case firmly to the casing. The casing, after the ripening period, showed virtually no damage due to cellulytic enzymes which were formed by the mold. Owing to the inner impregnation, the casing showed firm hold, but nevertheless could be peeled off well.

EXAMPLE 4

A double-viscosed (40% viscose outside, 60% inside) cellulose hydrate gel tube of caliber 45 which was reinforced with a fiber paper insert was, in the laid-flat state, run through a roller applicator, where it was charged with an aqueous composition which had a 4% solids fraction. The solids fraction was composed of 80% collagen hydrolysate and 20% collagen fibers. In addition, the composition contained 3% glyoxal, based on the solids weight, and 3% glycerol, based on the weight of the composition.

On the inside the tube was impregnated in a first step with polyamine-polyamide-epichlorohydrin resin which acted as anchoring agent. Subsequently, a PVDC dispersion was applied on the inside. The impregnated and coated casing was then dried in the inflated state in a hot air dryer to a moisture of 8 to 12%. It was then moistened to 16 to 18% and shirred. The application rate of collagen, determined by the above-described process, was 56 mg/m$^2$. In the underlying layer, there was still 78% of the value in the uppermost layer thereof, and in the third layer still 77%. This showed how deep the collagen hydrolysate had penetrated. The impregnated tube was very much softer than an untreated comparison tube. The shirred sticks, in addition, were very easy to process further.

EXAMPLE 5

A double-viscosed (40% of the viscose was applied outside onto the tube-shaped fiber paper, 60% on the inside) cellulose hydrate gel tube of caliber 48 which was provided with a fiber paper reinforcement was first predried. The cellulose hydrate layer situated on the outside was pigmented with 9% titanium dioxide white pigment, based on the total weight of regenerated cellulose. In this process, 50% of the water was taken off from it. Before the tube then passed into the actual dryer, on the inside a volume of 8 of an aqueous composition were charged which had a solids fraction of 4%. The solid comprised half collagen hydrolysate and half collagen fibers. In addition, the aqueous composition used for the inner impregnation contained 3% glyoxal, based on the solids weight, 6% glucono-δ-lactone and 3% glycerol.

In order to impregnate the outside of the casing, it was laid flat and charged with an aqueous composition according to example 3 using a roller applicator. Excess liquid was squeezed off using a roll pair. The tube was then conducted in the inflated state through a hot-air dryer where it was dried to a final moisture of 8 to 12%. Subsequently it was brought, to 16 to 18% moisture and shirred to form shirred sticks. The finished casing was impregnated on the inside with 150 mg of collagen hydrolysate per square meter in the uppermost layer, 60 mg/m$^2$ in the underlying layer and 25 mg/m$^2$ in the third layer (determination as described). On the outside, 140 mg of collagen hydrolysate were found in the uppermost layer and 70 mg/m$^2$ in the second layer.

The casing thus further prepared was stuffed with salami sausage emulsion. After the conventional ripening, the casing still exhibited good adhesion to the sausage emulsion, but nevertheless could be taken off without problems.

The invention claimed is:

1. A double-viscosed fibrous cellulose sausage casing comprising a pigmented outer cellulose hydrate layer and an impregnated inner cellulose hydrate layer wherein the impregnation of the inner cellulose hydrate layer comprises a collagen hydrolysate.

2. The fibrous cellulose sausage casing as claimed in claim 1, wherein the outer cellulose hydrate layer is pigmented by at least one white pigment.

3. The fibrous cellulose fiber sausage casing as claimed in claim 1 wherein the collagen hydrolysate has a molecular weight of 3000 to 30 000 dalton determined by gel permeation chromatography.

4. The fibrous cellulose sausage casing as claimed in claim 1, wherein said collagen hydrolysate comprises collagen fibers, and said collagen fibers are disposed on the outer and/or inner surface of said sausage casing.

5. The fibrous cellulose sausage casing as claimed in claim 1, wherein the outer cellulose hydrate layer is pigmented by titanium dioxide pigments.

6. The fibrous cellulose sausage casing as claimed in claim 1, wherein the collagen hydrolysate has a molecular weight of from 3500 to 25 000 dalton, determined by gel permeation chromatography.

7. The fibrous cellulose sausage casing as claimed in claim 1, wherein the collagen hydrolysate has a molecular weight of from 4000 to 12 000 dalton, determined by gel permeation chromatography.

8. The fibrous cellulose sausage casing as claimed in claim 1 wherein the collagen hydrolysate is covalently bonded to the cellulose hydrate using a crosslinker.

9. The fibrous cellulose sausage casing skin as claimed in claim 8, wherein said crosslinker comprises at least one low-molecular-weight compound having two or more reactive groups producing covalent bonds between the collagen hydrolysate and the cellulose hydrate layer.

10. The fibrous cellulose sausage casing as claimed in claim 9, wherein the crosslinker has two or more carbaldehyde groups or is an epoxidized linseed oil, a dialkylketene or tannin.

11. The fibrous cellulose sausage casing as claimed in claim 10, wherein the crosslinker has two or more carbaldehyde groups and is selected from glyoxal, glutardialdehyde, succinic dialdehyde or sugar dialdehydes.

12. The fibrous cellulose sausage casing as claimed in claim 1, wherein the inner cellulose hydrate layer is impregnated additionally with glucono-δ-lactone.

13. The fibrous cellulose sausage casing as claimed in claim 12, wherein the fraction of glucono-δ-lactone is 1.0 to 6.0% by weight, based on the weight of the inner cellulose hydrate layer.

14. The fibrous cellulose sausage casing as claimed in claim 12, wherein the fraction of glucono-δ-lactone is 2.0 to 5.0% by weight, based on the weight of the inner cellulose hydrate layer.

15. A process for producing a fibrous cellulose sausage casing as claimed in claim 1, wherein said process comprises the following steps:
    providing a double-viscosed fibrous cellulose sausage casing, the outer cellulose hydrate layer of which is pigmented,
    applying an aqueous composition which contains collagen hydrolysate, optionally also collagen fibers and/or glucono-δ-lactone, to the inner surface and/or outer surface of the fibrous cellulose sausage casing,
    drying the fibrous cellulose sausage casing.

16. A process for producing a fibrous cellulose sausage casing as claimed in claim 15, wherein the aqueous composition containing the collagen hyrolysate is applied to the fibrous cellulose sausage casing while the casing is in the gel state.

17. Raw sausage casing comprising fibrous cellulose sausage casing as claimed in claim 1.

18. Raw sausage casing as claimed claim 17, wherein said raw sausage casing is a salami casing.

* * * * *

UNITED STATES PATENT AND TRADEMARK OFFICE
CERTIFICATE OF CORRECTION

PATENT NO.         : 7,854,976 B2                                                    Page 1 of 1
APPLICATION NO.    : 12/066186
DATED              : December 21, 2010
INVENTOR(S)        : Hammer et al.

It is certified that error appears in the above-identified patent and that said Letters Patent is hereby corrected as shown below:

Claims

Column 7
Claim 3, Line 31, delete "fiber"

Column 8
Claim 9, Line 4, delete "skin"

Signed and Sealed this
Eighth Day of February, 2011

David J. Kappos
*Director of the United States Patent and Trademark Office*